United States Patent [19]
Hoyle et al.

[11] Patent Number: 5,741,380
[45] Date of Patent: Apr. 21, 1998

[54] MULTI-DENSITY BATT

[75] Inventors: William Clark Hoyle, Rockwell; Jerry Lee Nealy, Statesville, both of N.C.

[73] Assignee: Cumulus Fibres, Inc., Charlotte, N.C.

[21] Appl. No.: 600,853

[22] Filed: Feb. 13, 1996

[51] Int. Cl.⁶ ..................................................... B32B 17/00
[52] U.S. Cl. ........................ 156/62.6; 156/62.8; 156/177; 156/178; 156/296; 156/309.6
[58] Field of Search ................................. 156/62.6, 62.8, 156/177, 178, 296, 309.6

[56] References Cited

U.S. PATENT DOCUMENTS

| | | | |
|---|---|---|---|
| 4,668,562 | 5/1987 | Street | 428/218 |
| 4,753,693 | 6/1988 | Street | 156/62.8 |
| 5,079,074 | 1/1992 | Steagall et al. | 428/218 |

Primary Examiner—James J. Bell
Attorney, Agent, or Firm—Adams Law Firm, P.A.

[57] ABSTRACT

A multi-density batt having a plurality of overlaid thermoplastic fiber web layers. Each of the web layers comprise a homogeneous blend of matrix fibers and binder fibers. The binder fibers have a relatively low predetermined melting temperature and the matrix fibers have a relatively high predetermined melting temperature. The binder fibers and matrix fibers are heat-fused together. The batt has a width defining a cross direction and a length defining a machine direction. At least one integrally-formed, relatively thick, high density region extends in both the cross direction and machine direction of the batt. At least one integrally-formed relatively thin, low density region extends in both the cross direction and machine direction. The batt can be used to form a cushion, such as a seat cushion.

8 Claims, 10 Drawing Sheets

MULTI-DENSITY BATT

TECHNICAL FIELD AND BACKGROUND OF THE INVENTION

This invention relates to a batt fabricated from thermoplastic staple fibers. The batt is characterized by being formed from multiple thicknesses of non-woven staple fiber webs, overlaid, compressed, heated and fiber-bonded under compression to form a batt having different densities in different regions of the batt.

Batts of the type constructed according to the invention are intended for construction into cushions which have application in chairs, sofas and other residential and commercial furniture products, in vehicle seats, such as automobile and aircraft occupant seats, and other cushion products. The particular embodiment disclosed in this application relates to an automobile seat-bottom cushion such as could be used as a driver or front passenger seat. Seat-back cushions and other cushion elements and components can also be made according to the invention disclosed in this application.

This invention disclosed in this application is, by way of example, fabricated according to a method and apparatus for forming a non-woven batt by means of vacuum, as disclosed in applicant's prior U.S. Pat. Nos. 4,668,562, 4,753,693, and 5,079,074. Batts according to these prior patents are characterized by having a relatively high density which renders them suitable for uses such as mattresses, furniture upholstery and similar applications where substantial density and resistance against compression is desired, together with substantial resilience which will return the batt to its shape and thickness after compression for an indefinite number of cycles.

Batts according to this invention can also be manufactured by other methods, including the "air lay" method and using a fiber shaker to deposit cross-thicknesses of fibers onto the batt as it is formed.

U.S. Pat. No. 5,079,074 discloses a batt which has a dual density, defined as having two batt layers, one on top of the other, with one of the layers has a greater density than the other. However, the batts are the same thickness at all points, and the density is uniform along any horizontal plane.

There are applications where the density of a seat-bottom or seat-back cushion should optimally be greater at particular places along the surface of the cushion than at other places. For example, in the embodiment of a seat-bottom cushion for an automobile seat disclosed in this application, the left and right sides of the cushion include bolsters which flare upwardly to form supports for the lateral aspect of the hips and thighs of the seat occupant. This is particularly desirable in vehicles, since centrifugal force created by turning tends to project the occupant radially outwardly along a vector which varies according to the tightness and speed of the turn. The center portion of the seat cushion under the buttocks is lower, resulting in a "bucket" in which the occupant can seat without undue sliding, swaying or leaning as the automobile is turned.

Most prior art seats, such as used in automobiles, aircraft and other vehicles are fabricated of polyurethane foam. The seat is molded into a desired shape and size by introducing a predetermined-size charge of polyurethane precursor and catalyst under pressure into a closed mold. The precursor and catalyst react to create a gas which disperses through the mold, expanding the charge in the mold until the mold is completely filled. The polyurethane is cured by, for example, heat, and the mold is opened revealing a bun of polyurethane foam. The density of the bun at this point is essentially equal throughout its width, length and depth, since the gases generated in the mold expand equally in all directions.

For this reason, integrally-formed extensions, flanges, bolsters and the like tend to provide inadequate support. Over time, these areas can fragment or detach from the rest of the seat from wear resulting from, for example, a seat occupant first sitting down onto the edge of the seat as the vehicle is entered before swinging fully onto the seat, and leaning onto the edge of the seat as the vehicle is exited.

This problem can be reduced somewhat by fabricating the seat cushion from separate pieces of foam of differing densities. This is now typically done in higher priced automobile seats and in aircraft seats. This can be done by cutting blocks, strips, wedges and other shapes from separate pieces of foam of differing densities, and assembling the pieces in a jig to form the cushion. The foam pieces are Joined by bonding with adhesives.

In the case of an automobile seat-bottom cushion, wedges of high density foam may be bonded to the sides of a less-dense central portion to form side bolsters, or the wedges may be inserted under the edges of the cushion or in pockets in the sides of the cushion to provide greater resistance to deformation caused when entering or exiting the vehicle, or when the occupant leans against the bolsters during turns.

The process of making such a cushion is labor-intensive, subject to numerous manufacturing variables, requires skilled labor, and creates substantial waste as the various shapes are formed from larger blocks of foam. In any event, the Joint lines between areas of differing-density foam create potential weakness zones where the cushion is subject to breakage as the seat wears.

The invention described in this application avoids these problems by making multi-density batts in a continuous process from thermoplastic staple fiber blending through to the formation of a cushion "blank" ready for molding into its final shape. The cushion is then encased within a upholstery dress cover and mounted on a seat frame.

There are a number of advantages to be achieved by construction of cushions from this type of synthetic, staple fiber material. Such fibers are inherently lightweight and therefore easy to ship, store and manipulate during fabrication. These fibers are also generally less moisture absorbent than natural fibers such as cotton, or cellulosic based synthetic fibers such as rayon, and far less subject to fragmenting and deterioration than polyurethane foam.

Therefore, batts and the cushions made from them as disclosed in this application and made from these fibers can be maintained in a more hygienic condition. Many such fibers also tend to melt and drip rather than burn. While some of these fibers give off toxic fumes, the escape of such fumes can be avoided or minimized by encapsulating the cushion in a fire retardant or relatively air impermeable casing. This is a particularly important factor in automobiles, aircraft and other vehicles where emergencies involving fire are possible.

The resiliency inherent in synthetic fibers such as nylon and polyester is caused by the plastic memory which is set into the fiber during manufacture. By plastic memory is meant simply the tendency of a fiber to return to a given shape upon release of an externally applied force. Unless the plastic memory is altered by either elevated temperature or stress beyond the tolerance of the fiber, the plastic memory lasts essentially throughout the life of the fiber. This can make formation of a batt by compressing without bonding a much thicker, less dense batt difficult because of the tendency of the fibers to rebound to their original shape. Such fiber batts can be maintained in a compressed state, but this has sometimes involved the encapsulation of the batt in a cover or container. All of these methods create other problems such as unevenness and eventual deterioration of the batt due to fiber shifting, breakage and breakdown of the mechanical structure which maintains the compressed batt.

SUMMARY OF THE INVENTION

Therefore, it is an object of the invention to provide a batt which has multiple densities.

It is another object of the invention to provide a batt which has multiple densities, and which can be manufactured in a continuous process.

It is another object of the invention to provide a batt which has multiple densities which can be manufactured as an integrally-formed element in a continuous process.

It is another object of the invention to provide a batt which has multiple densities and is constructed from low and high-melting temperature synthetic thermoplastic staple fibers.

It is another object of the invention to provide a batt which has multiple thicknesses and densities and is constructed from low and high-melting temperature synthetic thermoplastic staple fibers bonded together by heat while compressed under vacuum pressure.

It is yet another object of the invention to provide a method and apparatus for forming a vacuum bonded batt wherein the desired densities and thicknesses of the batt can be established and maintained without physically compressing the batt between rollers, plates or the like.

These and other objects of the present invention are achieved in the preferred embodiments disclosed below by providing a multi-density batt having a plurality of overlaid thermoplastic fiber web layers forming a fiber batt. Each of the web layers is a homogeneous blend of matrix fibers and binder fibers. The binder fibers have a relatively low predetermined melting temperature and the matrix fibers have a relatively high predetermined melting temperature. The binder fibers and matrix fibers are heat-fused together.

The batt has a width defining a cross direction and a length defining a machine direction. At least one integrally-formed, relatively thick, high density region extends in both the cross direction and machine direction of the batt. At least one integrally-formed relatively thin, low density region extends in both the cross direction and machine direction.

According to one preferred embodiment of the invention, the relatively thick, high density region comprises a greater number of web layers than the relatively thin, low density region.

According to another preferred embodiment of the invention, the batt progressively varies in thickness along the machine direction of the batt to define a wedge-shaped region.

According to yet another preferred embodiment of the invention, the batt has two high density regions extending along opposing side edges of the batt in the machine direction, and separated by the relatively thin, low density region extending in the machine direction between and separating the two relatively high density regions.

According to yet another preferred embodiment of the invention, the high density regions comprise a greater number of web layers than the low density region.

According to yet another preferred embodiment of the invention, the batt is wedge-shaped along the machine direction of the batt.

According to yet another preferred embodiment of the invention, the relatively thin, low density region and the high density regions progressively vary in thickness along the machine direction of the batt to define a batt which is wedge-shaped in the machine direction.

According to yet another preferred embodiment of the invention, the batt comprising a seat bottom batt, the two opposed high density regions comprise seat occupant hip and thigh support regions.

An embodiment of a method of fabricating a multi-density batt according to the invention comprises the steps of forming a homogeneous blend of thermoplastic matrix fibers and thermoplastic binder fibers, the binder fibers having a relatively low predetermined melting temperature and the matrix fibers having a relatively high predetermined melting temperature. The blend of matrix and binder fibers is formed into a fiber web of indeterminate length and a plurality of the web layers are overlaid onto each other to form a fiber batt. The number of the web layers overlaid on top of each other is varied according to a predetermined pattern wherein the batt has at least one integrally-formed, high density region extending in both a cross direction and a machine direction, and at least one integrally-formed relatively thin, low density region extending in both the cross direction and machine The batt is compressed and heated while compressed to a temperature at or above the melting temperature of the binder fibers and below the melting temperature of the matrix fibers while compressed to fuse the matrix and binder fibers to each other to form a batt having intimately interconnected and fused web layers and intimately interconnected and fused matrix and binder fibers.

The batt is cooled to form a compressed batt having regions of differing density or differing thickness and density corresponding to the predetermined pattern.

According to a preferred embodiment of the invention, the step of varying the number of web layers in the batt comprises the steps of moving a batt-supporting conveyor in the machine direction though a batt-formation zone, laying successive web layers perpendicularly in the cross direction onto the moving conveyor in an overlapping relation by moving a reciprocating cross-lapping head carrying the web back and forth from a first side of the conveyor to an opposing second side, and, at intervals according to a predetermined pattern, reversing the direction of the cross-lapping head at a point between the first and second sides of the conveyor to thereby lay two web layers of predetermined width one on top of the other in the cross direction.

The original direction of travel of the cross-lapping head is resumed to lay a third web layer over the two previously formed web layers to define the high density region. The original direction of travel is continued for the remainder of the width of the conveyor to thereby define the relatively, thin, low density region.

According to another preferred embodiment of the invention, the method includes the step of drafting the batt in the machine direction according to a predetermined pattern to progressively vary the thickness of the batt in the machine direction from the first to the second side of the conveyor.

According to yet another preferred embodiment of the invention, the step of drafting the batt comprises the step of passing the batt between successive sets of drafting rolls positioned in spaced-apart relation along the machine direction of the batt conveyor.

According to yet another preferred embodiment of the invention, the step of drafting the batt comprises the steps of passing the batt between successive sets of drafting rolls positioned in spaced-apart relation along the machine direction of the batt conveyor. For a predetermined distance of travel of the batt the surface speed of a downstream set of the drafting rolls is progressively increased to progressively increase the draft and thereby progressively decrease the thickness of the batt.

For a predetermined distance of travel of the batt the surface speed of the downstream set of the drafting rolls is progressively decreased to progressively decrease the draft and thereby progressively increase the thickness of the batt.

The progressive increase and decrease of the draft of the batt forms a batt having alternating regions of increasing and decreasing thickness.

According to yet another preferred embodiment of the invention, the steps of compressing and heating the batt comprise the steps of positioning the batt on an air permeable support and applying a vacuum through the batt from one side of the batt to the other and through the air permeable support sufficient to reduce the thickness and increase the density of the batt throughout the thickness of the batt. The multi-layer web structure is heated to a temperature at or above the low melting temperature of the binder fibers and below the melting temperature of the matrix fibers while under vacuum and in the batt's reduced thickness state to fuse the binder fibers to themselves and to the matrix fibers to form a batt having intimately interconnected and fused web layers which retain the reduced thickness and increased density of the batt induced by the applied vacuum.

A further embodiment of the method of fabricating a multi-density batt according to the invention comprises the steps forming a homogeneous blend of thermoplastic matrix fibers and thermoplastic binder fibers, the binder fibers having a relatively low predetermined melting temperature and the matrix fibers having a relatively high predetermined melting temperature. The blend of matrix and binder fibers is formed into a fiber web of indeterminate length. The thickness of the web is varied according to a predetermined pattern to form a batt wherein the batt has at least one integrally-formed, high density region extending in both a cross direction and a machine direction, and at least one integrally-formed, relatively thin, low density region extending in both the cross direction and machine direction.

The batt is compressed and heated while compressed to a temperature at or above the melting temperature of the binder fibers and, below the melting temperature of the matrix fibers while compressed to fuse the matrix and binder fibers to each other to form a batt having intimately interconnected and fused web layers and intimately interconnected and fused matrix and binder fibers.

The batt is cooled to form a compressed batt having regions of differing density or differing thickness and density corresponding to the predetermined pattern.

According to another preferred embodiment of the invention, the step of laying successive web layers perpendicularly in the cross direction onto the moving conveyor in an overlapping relation comprises the step of providing first, second and third cross-lapping heads in series from an upstream portion to a downstream portion of the batt conveyor, each of which cross-lapping heads performing the step of laying successive web layers perpendicularly in the cross direction onto the moving conveyor in an overlapping relation by moving a back and forth from a first side of the conveyor to an opposing second side.

According to yet another preferred embodiment of the invention, the batt comprises a vehicle seat batt blank, and further wherein said blank is formed into a vehicle seat batt by molding the blank into a final shape.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

General Description of Method

Figure 1:
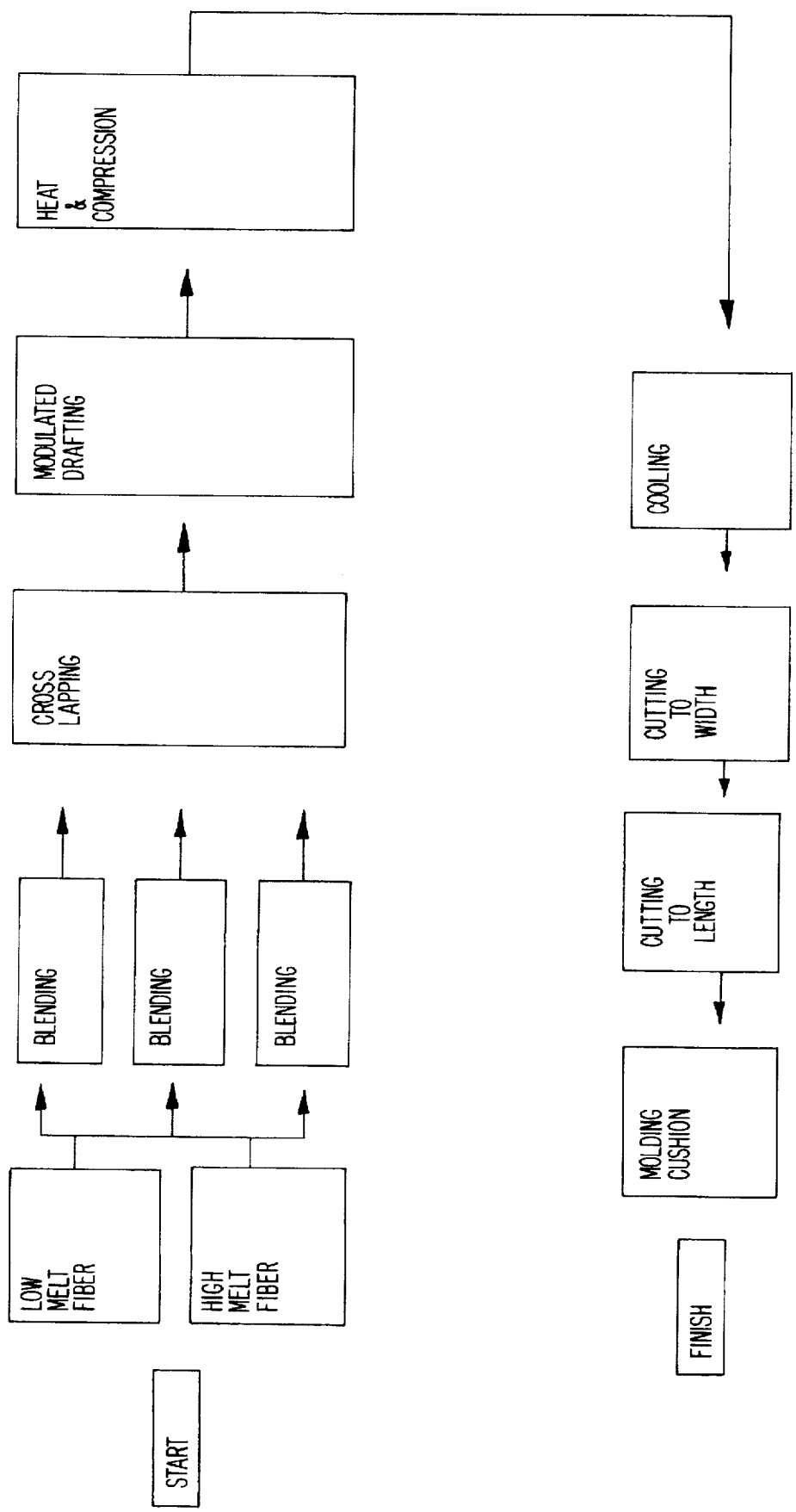
FIG. 1 is a diagrammatic flow chart of a method according to an embodiment of the invention.

Referring now specifically to the drawings, a flow diagram according to the present invention is illustrated in FIG. 1. The method begins at "Start" by opening and blending suitable staple fibers. The staple fibers to be used are chosen from the group defined as thermoplastic polymer fibers such as nylon and polyester. Of course, other thermoplastic fibers can be used depending upon the precise processing limitations imposed and the characteristics of the cushion which are desired at the end of the process. For purposes of this application and to illustrate the process and the apparatus, the batt is constructed of 80 percent Hoechst Type 295 15 denier, 3 inch (7.6 cm) staple polyester matrix fibers, and 20 percent of either Hoechst 4 denier, 2 inch (5 μm) staple single component polyester copolymer, or 4 denier, 2 inch (5 cm) Unitika sheath/core bi-component polyester binder fibers. Batts having other percentages of the binder and matrix fibers are also within the scope of the invention. The Type 295 polyester is a polyester fiber which has a softening temperature of 425° F. (218° C.) and a melting temperature of approximately 475 degree(s) F. (248° C).

As used in the specification and claims, the Type 295 polyester is referred to as having a relatively high predetermined melting temperature as compared with either the Hoechst polyester copolymer, or Unitika sheath core/low melt polyester which has a sheath component melting temperature of approximately 390° F. (200° C.), and begins to soften and become tacky at approximately 350° to 370° F. (176°–188° C.).

As used in this application, however, the term melting does not necessarily refer only to the actual transformation of the solid polyester binder fibers into liquid form. Rather, it refers to a gradual transformation of the fibers (or in the case of a sheath/core fiber, the sheath of the fiber) over a range of temperatures within which the polyester becomes sufficiently soft and tacky to cling to other fibers within which it comes in contact, including other binder fibers having its same characteristics and, as described above, adjacent polyester fibers having a higher melting temperature. It is an inherent characteristic of thermoplastic fibers such as polyester and nylon, that they become sticky and tacky when melted, as that term is used in this application.

Referring again to FIG. 1, the opened and blended fiber intermixture is conveyed to a web forming machine such as a garnett machine. As illustrated in this application, the thickness of a single web formed in the web formation step will be approximately 0.5 to 0.75 inch (1.3–1.9 cm) thick. However, an air laying machine, such as a Rando webber can be used to form a thick, single layer web structure. Further discussion relates to the multi-layer web structure formed by a garnett machine.

Once formed, the web is formed into a multi-layer web structure by means of a cross-lapper which cross-laps multiple thicknesses of the web onto a moving slat conveyor in progressive overlapping relationship. The number of layers which make up the multi-layer web structure is determined by the speed of the slat conveyor in relation to the speed at which successive layers of the web are layered on top of each other. In the examples disclosed below, the number of single webs which make up the batt range between 6 and 66, with the speed of the apron conveyor ranging between 60 ft/min (18 m/min) and 5 ft/min (1.6 m/min). These values are achieved using three cross-lappers. Other values— higher or lower—could be achieved using more or less cross-lappers.

Once the batt is formed on the cross-lapper, it is moved into a series of drafting rolls, where, as described below, the batt is drafted such that its thickness varies along its length in a predetermined manner.

From drafting, the batt is moved successively onto first and second rotating drums where the batt is simultaneously compressed by vacuum and heated so that the relatively low melting temperature binder polyester softens or melts to the extent necessary to fuse to itself and to the other polyester fibers having a relatively higher melting point. The batt is cooled to form a batt having multiple densities and/or thicknesses substantially the same as when the batt was compressed and heated on the rotating drums.

Then, as desired, the batt may be cut to length and width as needed to separate individual cushion blanks. An individual cushion blank is later molded into its final shape and enclosed within a dress cover.

The resulting construction offers substantial advantages over materials of equivalent density such as polyurethane foam. The resulting cushions are usable in environments where a relatively high degree of fire retardancy and relatively low output of toxic fumes is desired. Polyester is particularly desirable from this standpoint, since it does not flash-burn and is self-extinguishing. When fully melted to liquid state, polyester drops off when exposed to flame or rolls, with a black, waxy edge forming along the effected area. By enclosing the entire cushion within a cover, a much safer product than one made with foam is achieved.

Description of Processing Line

Figure 2:
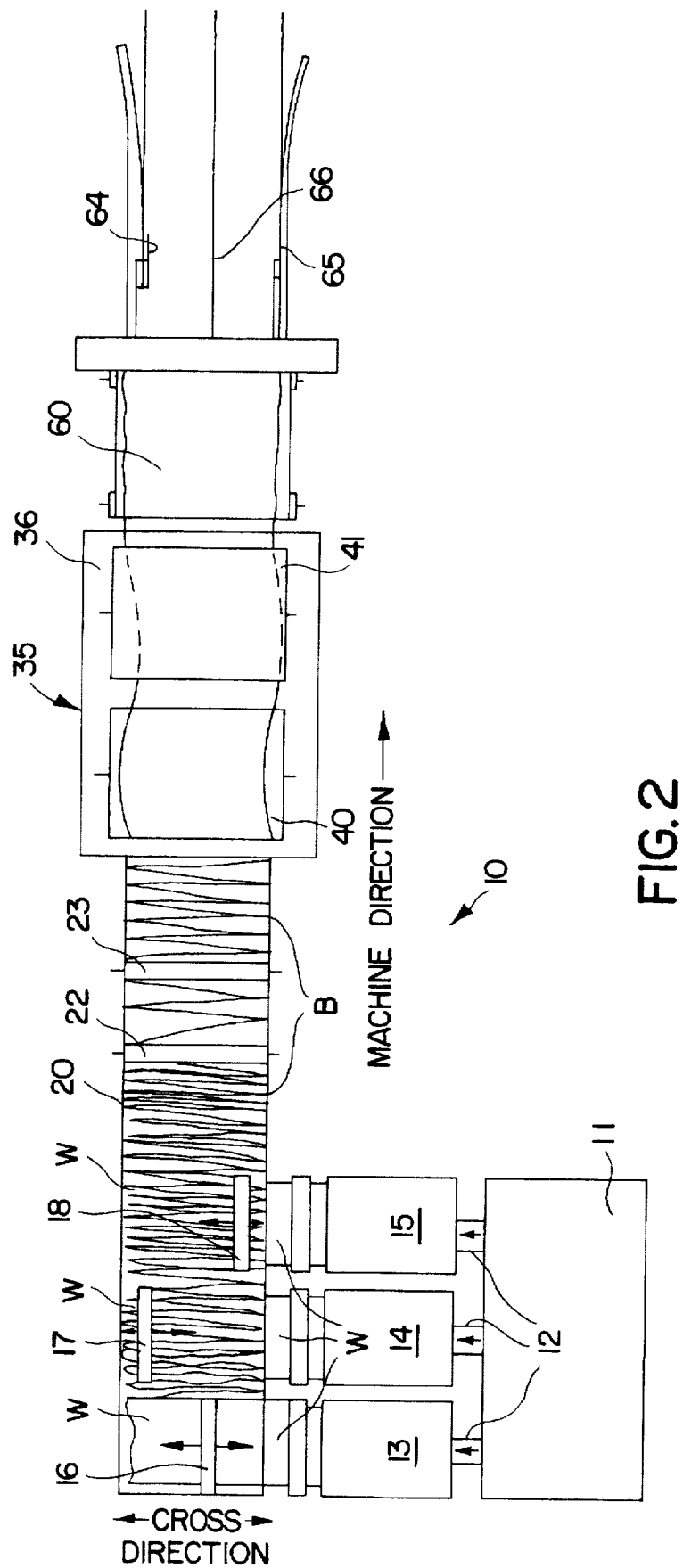
FIG. 2 is a simplified top plan view of the processing line on which a batt according to an embodiment of the invention is made.

Referring now to FIG. 2, a simplified top plan view of a processing line for making a cushion according to the invention is illustrated an generally indicated at broad reference numeral 10. As noted above, polyester staple fibers are blended in a fiber blender 11 and conveyed by overhead conveyor pipes 12 to three garnett machines 13, 14, 15. The garment machines card the staple fibers into a nonwoven web of desired width and deliver the webs "W" to respective cross-lapping heads 16, 17 and 18 which cross-laps multiple thicknesses of the web "W" onto a moving slat conveyor 20 in a progressive overlapping relationship. The direction of movement of the conveyor 20 is referred to in this application as the "machine direction."

The cross-lapping heads 16, 17, and 18 reciprocate back and forth from one side of the conveyor 20 to the other side, referred to in this application as the "cross direction." The cross-lapping heads 16, 17 and 18 reverse directions multiple times during their traverse for an interval less than the width of the conveyor 20 to increase the number of layers of the web in a particular region of the web, as described in further detail below.

The result is a multi-layer batt "B" formed of the web layers "W" which is delivered on the conveyor 20 to a drafting area, where the batt "B" is drafted. However, rather than drafting the batt "B" in the usual sense, the batt "B" is drafted according to a predetermined pattern to progressively vary the thickness of the batt in the machine direction across the width of the conveyor 20.

Sets of spaced-apart drafting roll assemblies 22 and 23 define a single drafting zone 22–23, within which drafting takes place. However, drafting can take place in two or more drafting zones if required.

This drafting step, together with the formation of the web "W" with regions of differing thickness, forms a batt "B" having regions of differing thickness which extend in the machine and cross directions.

Figure 3:
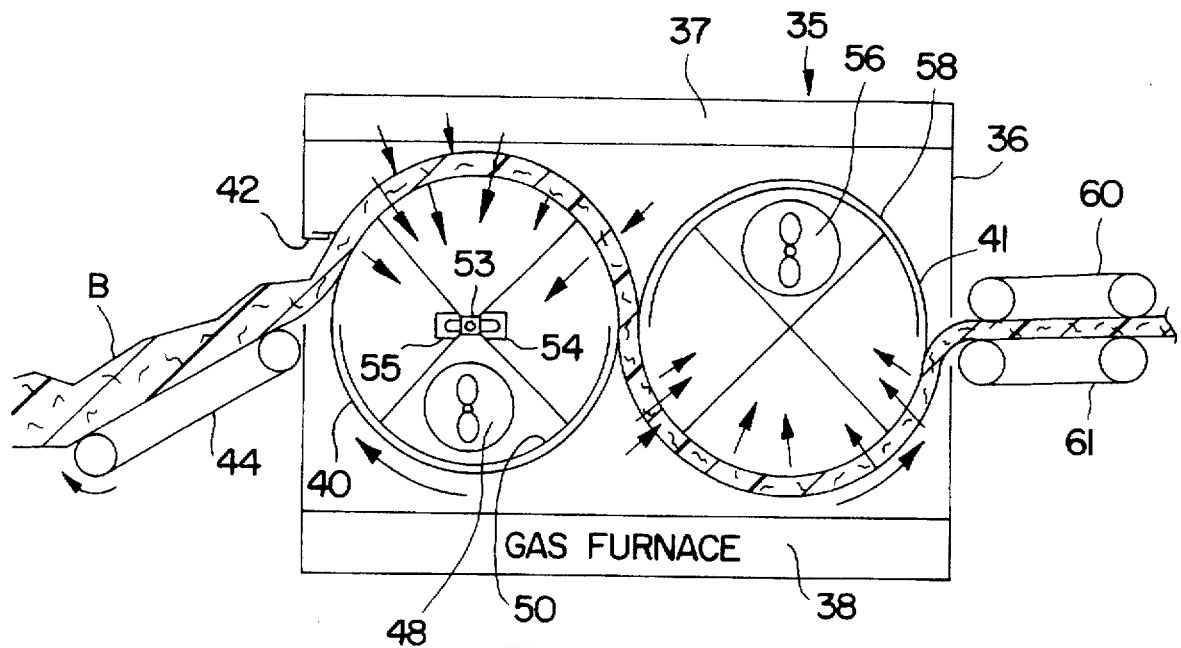
FIG. 3 is a side schematic side elevation of a vacuum-bonding apparatus by which one embodiment of the method of the invention may be practiced.

The batt "B" is conveyed from the drafting zone 22–23 into a vacuum-bonding apparatus 35. As is best shown in FIG. 3, vacuum-bonding apparatus 35 includes a large substantially rectangular sheet metal housing 36, the upper extent of which comprises an air recirculation chamber 37. A one million BTU (252,000 kg-cal) gas furnace 38 is positioned in the lower portion of housing 36. Upward movement of the heated air from gas furnace 38 through the housing 36 provides the heat necessary to soften and melt the polyester.

Figure 4:
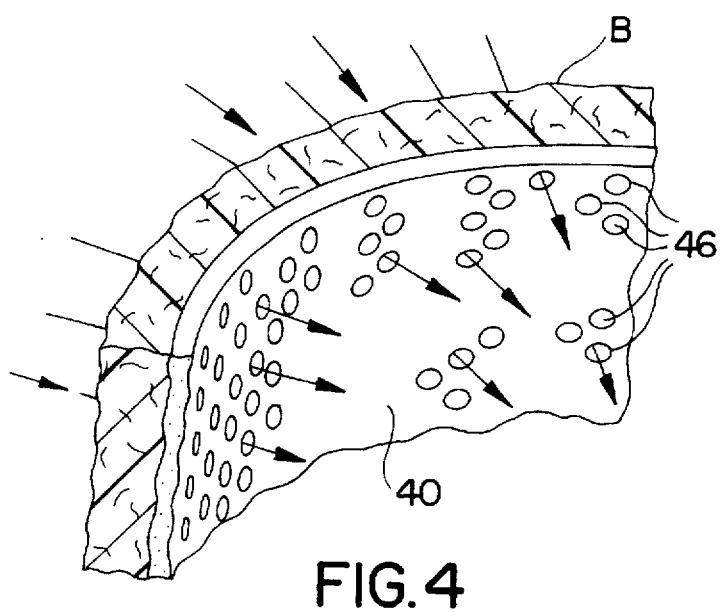
FIG. 4 is an enlarged, fragmentary perspective view showing the perforated surface of one of the drums with a vacuum-compressed multi-density batt thereon.

Two counter-rotating drums 40 and 41, respectively, are positioned in the central portion of housing 36. Drum 40 is positioned adjacent an inlet 42 through which the batt "B" is fed. The batt "B" is delivered from the upstream processes described above by means of an infeed apron 44. Drum 40 is approximately 55 inches (140 cm) in diameter and is perforated with a multiplicity of holes 46, as shown in FIG. 4, in the surface to permit the flow of heated air.

In the embodiment illustrated in this application, the drums 40 and 41 each have approximately 12 holes sq/in (2 sq/cm) with each hole 46 having a diameter of ⅛ inch (3.2 mm).

A suction fan 48 preferably having a diameter of 42 inches (107 cm) is positioned in communication with the interior of drum 40. As is also shown by continued reference to FIG. 3, the lower one half of the circumference of drum 40 is shielded by an imperforate baffle 50 so positioned inside drum 40 that suction-creating air flow is forced to enter drum 40 through the holes 46 in the upper half.

Drum 40 may also mounted for lateral sliding movement relative to drum 41 by means of a shaft 53 mounted in a collar 54 having an elongate opening 55. This facilitates adjustment to a wide range of batt thicknesses. Once adjusted, shaft 53 can be locked in any given position within collar 54 by any conventional means such as a locking pillow block or the like. (Not shown).

Drum 41 is mounted immediately downstream from drum 40 in housing 36. Drum 41 includes a ventilation fan 56, also having a diameter of 42 inches (107 cm). Note that fans 48 and 56 are shown in FIG. 3 in reduced size for clarity. An imperforate baffle 58 is positioned inside drum 41 and encloses the upper half of the circumference of drum 41. Baffle 58 forces suction-creating air flow to flow through holes in the lower half of the drum surface. Preferably, drum 41 contains the same number and size holes as described above with reference to drum 40.

The exiting batt "B" is simultaneously cooled and carried away from housing 36 by a pair of vertically-spaced top and bottom perforated outfeed aprons 60 and 61. Ambient-temperature air is forced through the bottom apron 61 by a fan (not shown), through the batt "B" and through the top apron 60. The final thickness of the batt "B" is therefore determined by the vertical space between the aprons 60 and 61. The batt "B" is maintained in its compressed form upon cooling, since the solidification of the low melt temperature binder fibers in their compressed state bonds the binder fibers and the matrix fibers together in the compressed state.

The batt "B" leaves the cooling aprons 60 and 61 as a rank and file array of connected cushion blanks 70 and passes into a cutting zone where the batt "B" is cut to a finished width by trimming off the edges, and, if two or more widthwise arranged cushions have been formed, the batt "B" is cut along the machine direction to sever the cushion blanks 70 from each other. The term "cushion blank" is used because the cushion blank undergoes a further molding process before becoming a "cushion" which is used to construct an automobile seat. However, in other applications where the product is usable without further molding, the term "cushion" would more properly be used.

As is shown in FIG. 2, a pair of vertically-positioned cutting saws 64, 65 trim the edges of the batt "B", while a vertically-positioned saw 66 cuts the batt "B" down the center.

Detailed Description of Multi-Density Web Layer Formation

Referring now to FIGS. 5A–G and 6, formation of the multi-density web layer "W" is described. As noted above, the cross-lapping heads 16, 17 and 18 lay the webs formed on the garnett machines 13, 14 and 15 onto the conveyor 20. The lengthwise dimension of the webs from the garnett machines becomes the cross direction on the conveyor 20, since the garnett machines are perpendicular to the conveyor 20. A conventional cross-lapping head reciprocates continually from one side of the conveyor to the other, laying onto the conveyor a single thickness of web during each pass. However, as is shown in FIGS. 5A–G, the cross-lapping heads 16, also representative of heads 17 and 18, reverse direction to lay multiple thicknesses over a portion of the width of the conveyor 20 during each pass.

Figure 5A:
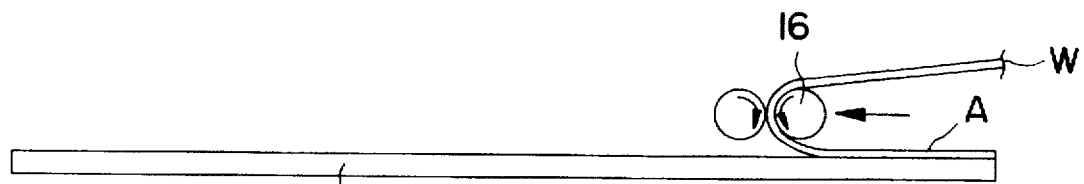
FIGS. 5A–5G are sequential side elevations which illustrate the sequence of formation of a web layer into a multi-thickness web layer.
Figure 5B:
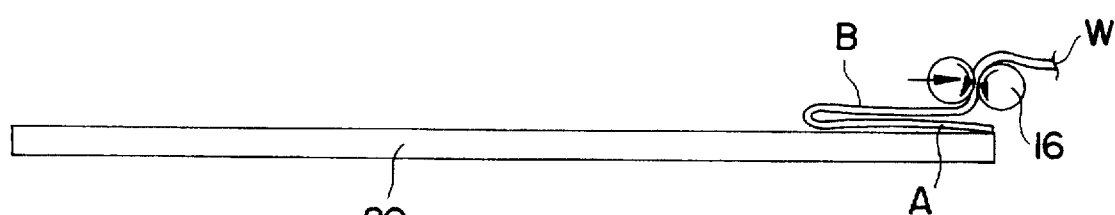
Figure 5C:
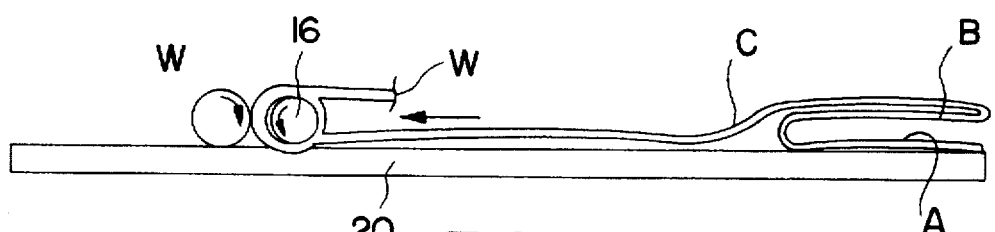

As is shown in FIG. 5A, as the cross-lapping head 16 begins its travel from one side of the conveyor 20, it lays a single layer of fiber web "A" onto the conveyor 20 as moves forward. Rather than continuing across to the other side of conveyor 20, the cross-lapping head 16 reverses direction after only a portion of the width of the conveyor 20 has been traversed and lays a second fiber web layer "B" onto the just-laid layer "A", as shown in FIG. 5B. The cross-lapping head 16 then reverses direction again and this time lays a fiber web layer "C" across an additional portion of the width of conveyor 20, but still less than the entire width. Thus, on one end of the conveyor 20 there are now three web layers "A", "B" and "C", and on the remainder of the width of the web "W" a single layer "C."

Figure 5D:
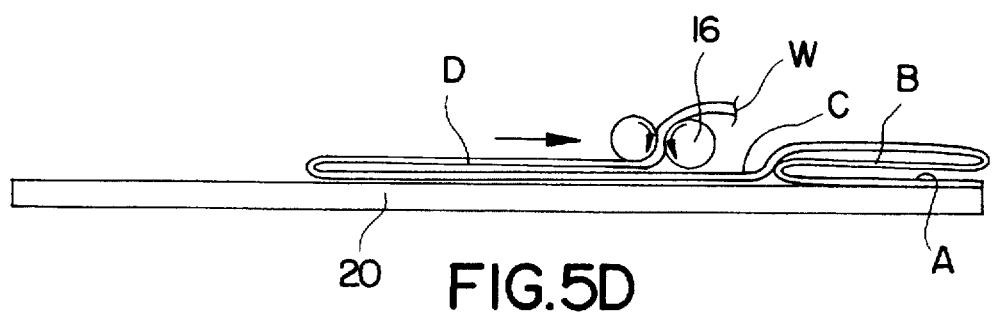
Figure 5E:
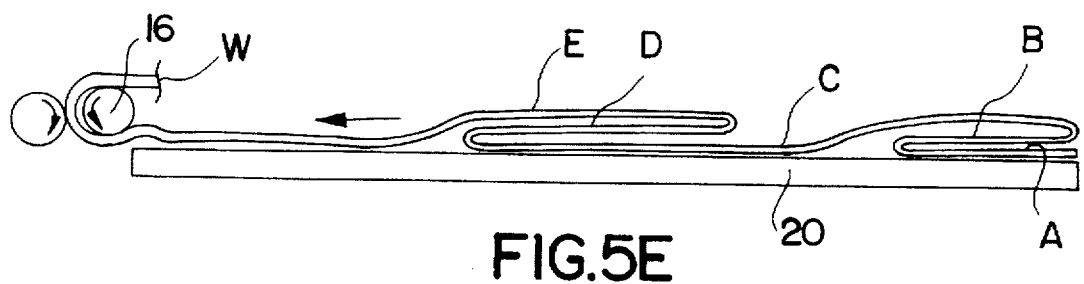

Referring now to FIG. 5D, the cross-lapping head 16 again reverses direction and begins back across the conveyor 20, laying a second web layer "D" over the just-laid layer "C". As shown in FIG. 5E, the cross-lapping head 16 then reverses direction again and continues across the conveyor 20, laying a web layer "E" across the remainder of the width of the conveyor 20.

Figure 5F:
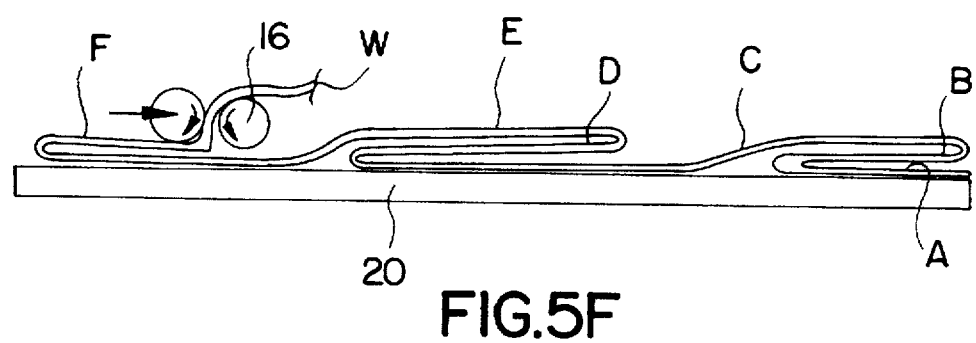
Figure 5G:
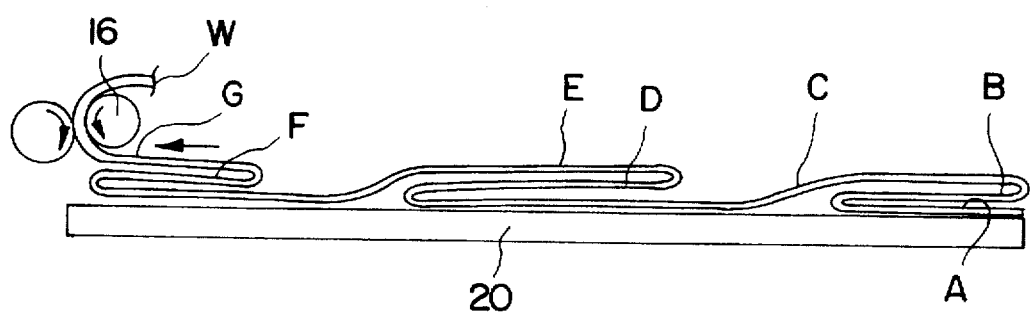

In FIG. 5F the cross-lapping head 16 reverses direction at the opposite end of the conveyor 20 and begins back across laying a second fiber web layer "F" on top of the just-laid web layer "E". As shown in FIG. 5G, the cross-lapping head 16 reverses direction once again and lays a third web layer "G" over the Just-laid web layer "F."

In the example given, the cross-lapping head 16 can now proceed directly back across the conveyor 20 laying a single further web layer, or duplicate the pattern set out above in reverse. The other cross-lapping heads 17 and 18 can duplicate the pattern set out above, can lay only a single web layer during each pass across the conveyor 20, or can lay a completely different pattern. The pattern shown in FIGS. 5 and 6 is a 3×1 pattern, since the maximum number of thicknesses of the batt "B" is three and the ratio between the maximum number and the minimum number is 3×1.

Figure 6:
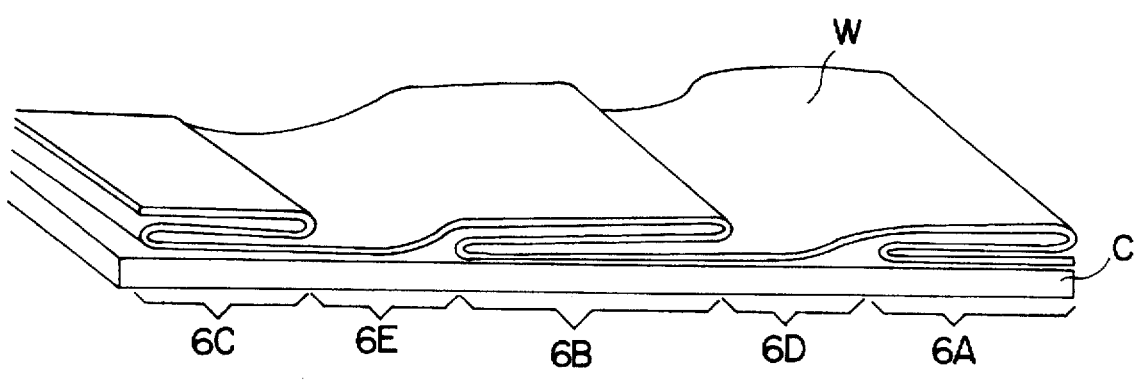
FIG. 6 is a fragmentary perspective view of a completely formed multi-thickness web layer.

In another example using two cross-lappers, one forming a pattern as in FIGS. 5 and 6 and the other laying a single layer in the conventional manner, the pattern would be a 2×1 pattern, since the ratio of the maximum number of web layers would be four and the minimum number 2.

As noted above, the conveyor 20 constantly moves forward as the web layers "A"–"G" are laid in progressive overlapping relationship. Thus, the number of layers which make up the batt "B" is determined by the speed of the slat conveyor 20 in relation to the speed at which successive layers of the web are layered on top of each other.

Two separate motors are used to create the patterning in the web layers described above. On each cross-lapping head 16, 17 and 18, one motor (not shown) constantly feeds a web layer "W" to the conveyor 20 from a respective one of the garnett machines 13, 14, 15, while another motor, such as a reversing drive DC motor with position encoder (not shown) reverses the direction of travel of the respective cross-lapping head 16, 17 or 18 according to a predetermined pattern. Both motors operate under command of computer programmed with parameters specific to a particular batt "B" to be produced.

As shown in FIG. 6, the result is a web layer having three relatively thick regions 6A, 6B and 6C separated by two relatively thinner regions 6D and 6E. Each of these regions extend uniformly in the machine direction. In other words, at any given point across the width of the web layer "W", the thickness at that point along the length of the web layer should be essentially the same. Thus, the thickness is uniform along the machine direction of the web layer. Since the batt "B" is made up of multiple web layers "W" which may all be formed in the same manner as the single web layer "W" shown in FIG. 6, the multi-layer "B" may also have a uniform thickness in the machine direction at any given point along the machine direction of the batt "B".

Likewise, at any point along the length of the web layer "W" the widthwise profile will be the same, i.e., a web layer "W" having three relatively thick regions 6A, 6B and 6C separated by two relatively thinner regions 6D and 6E.

Detailed Description of Multi-Density Web Layer Drafting

Figure 7:
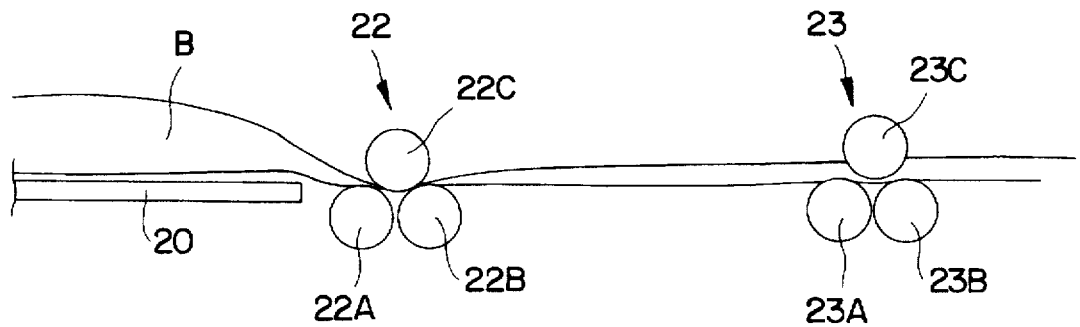
FIG. 7 is a fragmentary side elevation of one of the drafting zones where the thickness of the batt in the machine direction is varied.

The batt "B" formed on the conveyor 20 by the cross-lapping heads 16, 17 and 18 as described immediately above proceeds into a drafting zone where the variable thickness of the batt "B" along the machine direction is created. Ordinarily, a fiber drafting zone operates on the principle that a downstream set of drafting rolls rotating at a constant surface speed faster that an upstream set of drafting rolls will elongate the fibers being drafting by a factor corresponding to the surface speed of the upstream rolls in relation to the downstream rolls. However, as shown in FIGS. 7 and 8, if the draft, i.e., the ratio of surface speed of the upstream set of drafting rolls 22 to the surface speed of the downstream set of drafting rolls 23 varies constantly between two values, then the thickness of the batt "B" being drafted will vary inversely.

Figure 8:
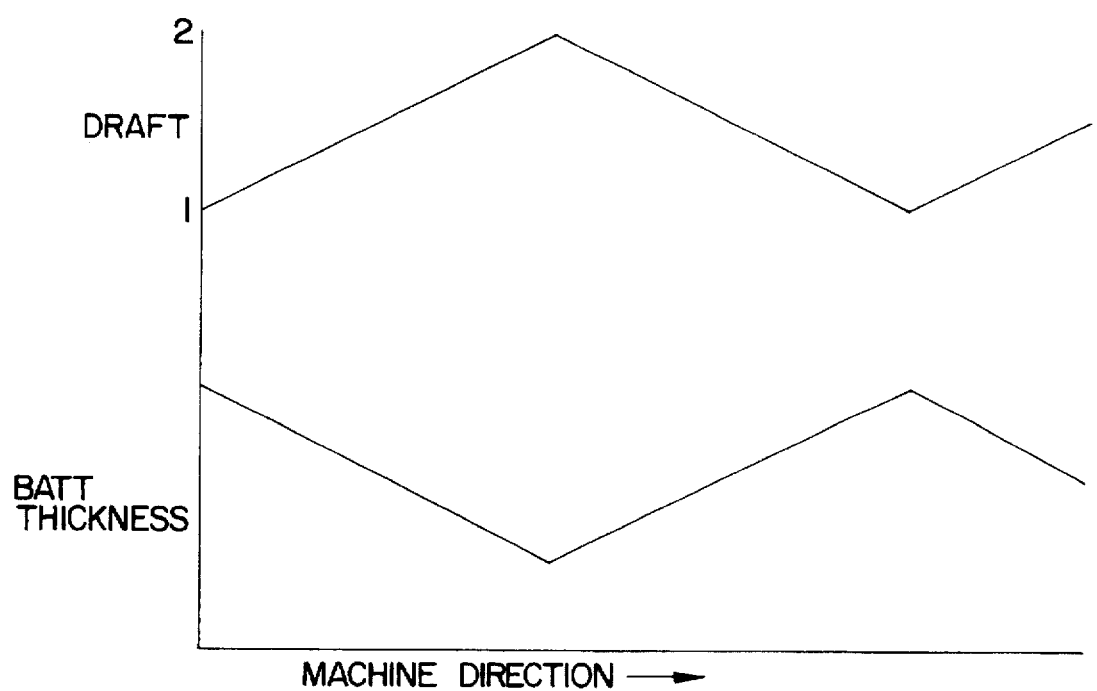
FIG. 8 is a table showing a correlation between draft and batt thickness.

This is shown in FIG. 8, where the draft is shown varying between 1 (no draft) and 2, where the output thickness is 2× the input thickness. Thus, drafting rolls 22A, 22B and 22C of the upstream drafting roll set 22 rotate at a constant surface speed, while drafting rolls 23A, 23B and 23C of the downstream drafting roll set 23 rotate at a constantly and evenly increasing and decreasing surface speed between the same speed as drafting rolls 23A, 23B and 23C and, for example, twice the speed.

Figure 9:
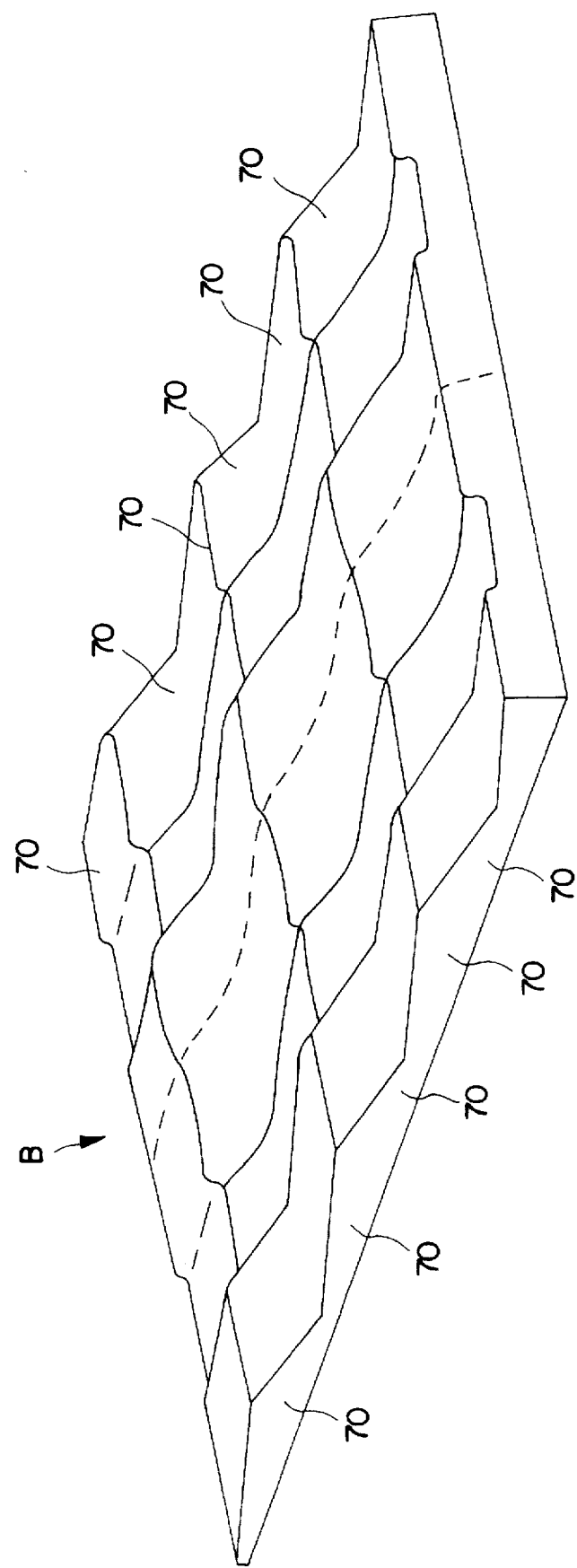
FIG. 9 is a perspective view showing, in an exaggerated view for clarity, an entire width of batt as it exits the drafting zones.

The batt "B" resulting from the variable drafting described above is shown schematically and in an exaggerated manner in FIG. 9. The character of the batt "B" has been substantially changed. Now, the thickness of the batt "B" varies both in the machine direction and the cross direction. The batt "B" has at least one integrally-formed, high density region extending in both the cross direction and machine direction of the batt "B" and at least one integrally-formed low density region extending in both the cross direction and machine direction.

The batt "B" shown in FIG. 9 is ready for compression and bonding. The pattern created by the cross-lapping and drafting in the illustrated exemplary embodiment of the invention is for a seat bottom cushion 75 intended for an automobile driver's or front passenger's seat. The batt "B" has may have two or more cushion blanks 70 side-by-side in the cross direction extending along the machine direction.

Detailed Description of Batt Compression and Bonding

Referring again to FIGS. 3 and 4, the batt "B" enters the vacuum-bonding apparatus 35 in uncompressed form through inlet 42. Suction applied through the holes 46 in drum 40 immediately forces the batt "B" tightly down onto the rotating surface of drum 40 and by air flow through the holes 46 and through the porous web structure. As is apparent, the extent to which compression takes place at this point can be controlled by the suction exerted through drum 40 by fan 48. The air temperature is approximately 370° F. (188° C.).

By continued reference to FIG. 3, it is seen that one side of the batt "B" is in contact with drum 40 along its upper surface. At a point between drum 40 and drum 41, the batt "B" is transferred to drum 41 so that the other side of the batt "B" is in contact with the surface of drum 41 and the surface which was previously in contact with drum 40 is now spaced-apart from the surface of drum 41. In effect, a reverse flow of air is created. Therefore, the polyester fibers having a relatively low melting temperature can be melted throughout the thickness of the batt "B" without any melting of the polyester fibers having the relatively high melting temperature.

Figure 12:
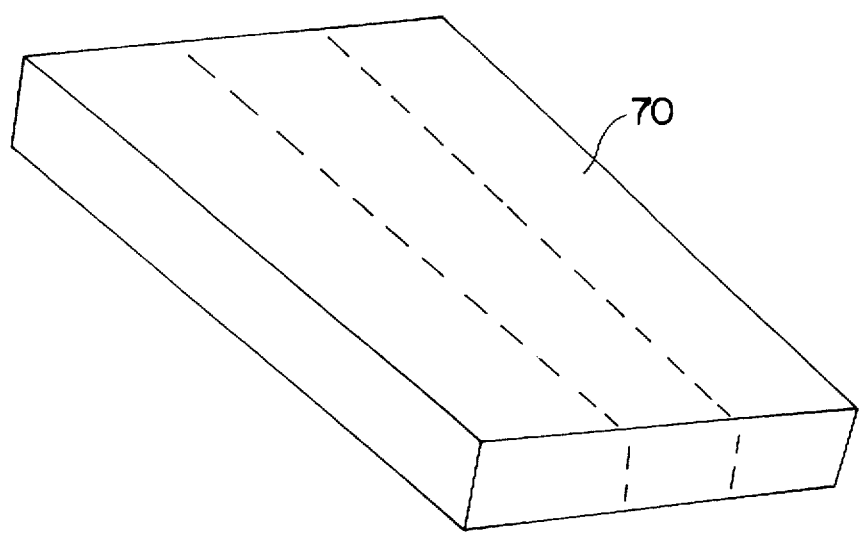
FIG. 12 is a perspective view showing a single cushion blank wherein the varying thickness regions have been completely compressed out of the batt to form regions of maximum density, shown in heavy stippling.

The varying thickness of the batt "B" may or may not be substantially affected by passage through the compression bonding apparatus 35, depending on the spacing between the drums 40 and 41, the vacuum pressure exerted on the batt "B" and similar variables. For example, the batt "B" can be compressed to the point where the batt has the same thickness throughout in both the cross and the machine direction. This, of course, increases the density of the batt "B" in the formerly thicker areas to the maximum extent. See FIG. 12. Conversely, the batt "B" can be passed through the compression bonding apparatus 35 so that the variation in thickness is reduced to a desired degree, with a correspondingly reduced increase in the density in those thicker areas as, for example, in FIG. 10. Additional density can be obtained during final molding.

Figure 10:
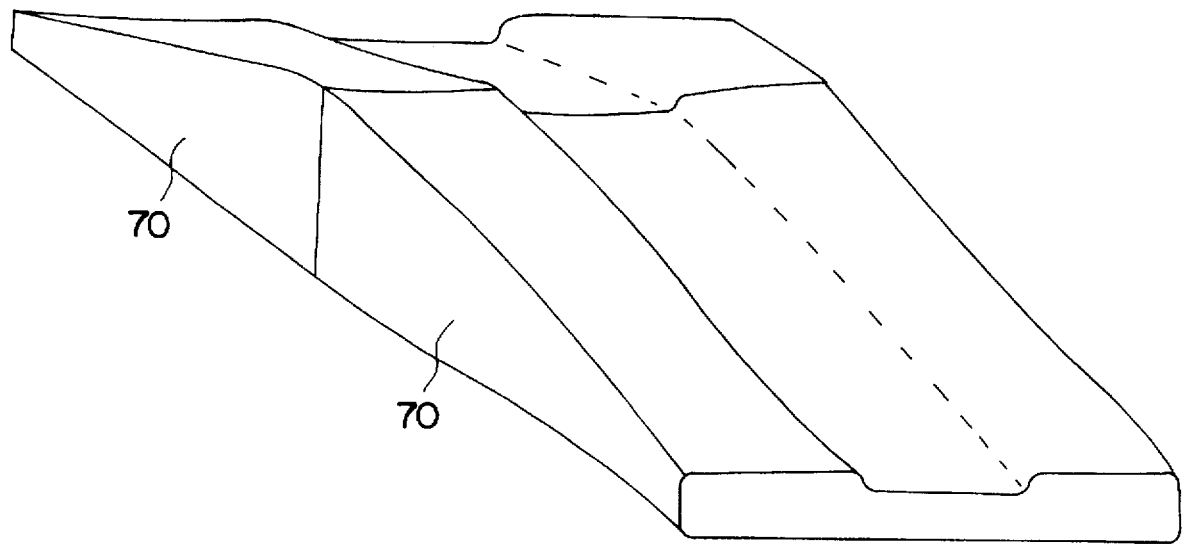
FIG. 10 is a perspective view showing, in an exaggerated view for clarity, a two-cushion blank segment of the batt, with the two cushion blanks formed back-to-back.
Figure 11:
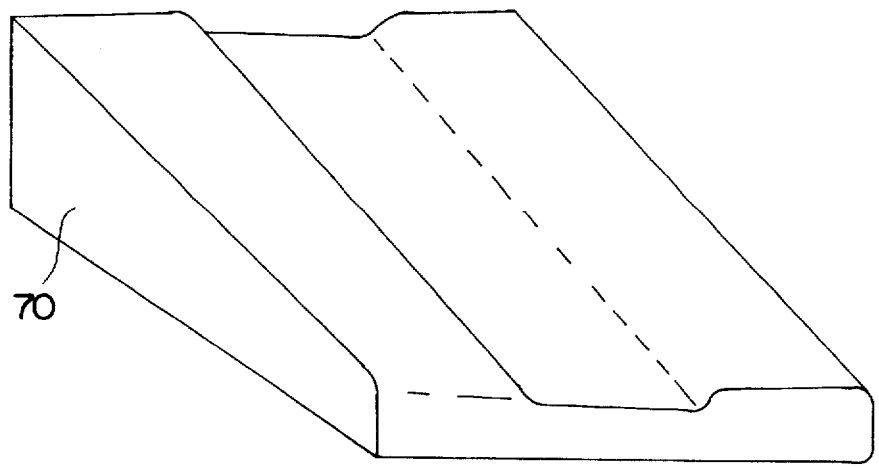
FIG. 11 is a perspective view showing, in an exaggerated view for clarity, a single cushion blank.

The side-by-side cushion blanks 70 are separated from each other by the vertically positioned saw 66 described above and shown in FIG. 2. The relatively wide center region 6B is thus divided in half-one half forming a side of two back-to-back cushion blanks 70, and the other half forming a side of another two back-to-back cushion blanks 70, as is shown in FIG. 10. The two cushion blanks 70 are separated from each other by cross-cutting to form a single cushion blank 70, as shown in FIG. 11.

Figure 13:
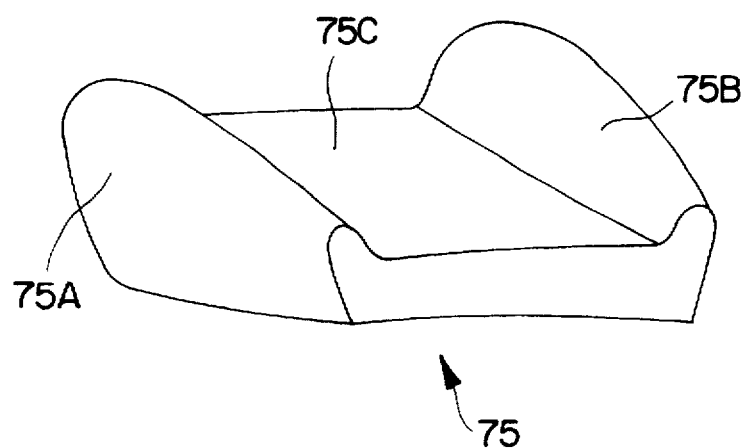
FIG. 13 is a perspective view of a completed, molded seat-bottom cushion according to an embodiment of the invention.

The cushion blank 70 is processed in a subsequent process by placing in the cushion blank 70 into a mold having the final seat cushion shape desired. The cushion blank 70 is further compressed and heated to force the cushion blank 70 into the final shape. As is shown in FIG. 13, a fiber cushion 75 has side edge regions 75A and 75B which are substantially more dense, for example, 1.70 oz/bd ft, than the central region 75C which supports the buttocks of the seat occupant, which is less dense, for example, 1.2–1.3 oz/bd ft.

Figure 14:
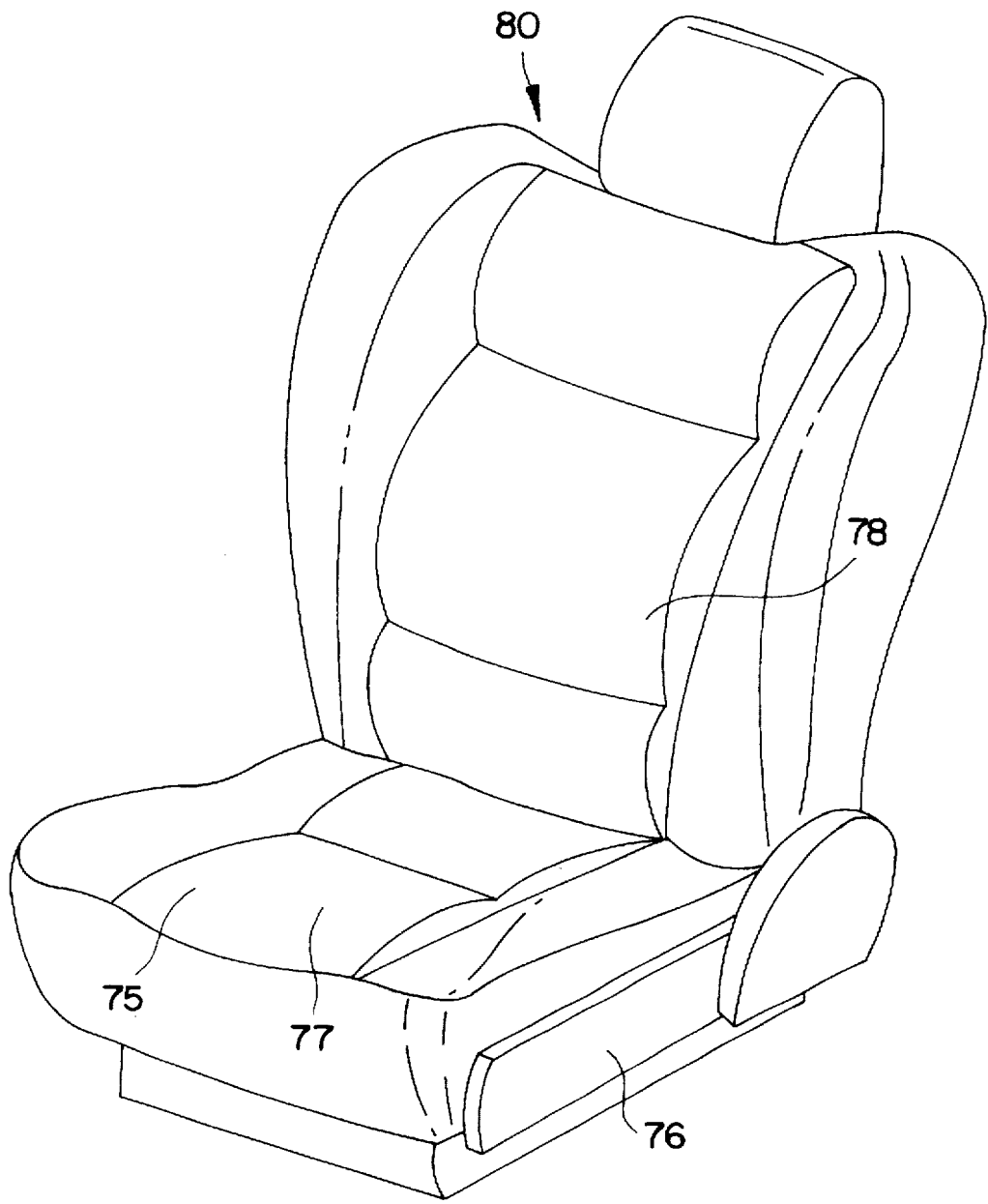
FIG. 14 is a perspective view of a completed automobile bucket seat incorporating a seat-bottom cushion according to an embodiment of the invention.

The cushion 75 is then mounted on a frame 76, covered with upholstery or some other form of dress cover 77, and assembled with a seat back cushion 78, which may be fabricated in the same manner as described above, into a seat 80, as shown in FIG. 14.

As noted above, a wide variety of high density batts can be created by altering the manufacturing of variables in many different ways.

A multi-density cushion is described above. Various details of the invention may be changed without departing from its scope. Furthermore, the foregoing description of the preferred embodiment of the invention and the best mode for practicing the invention are provided for the purpose of illustration only and not for the purpose of limitation--the invention being defined by the claims.

We claim:

1. A method of fabricating a multi-density batt, comprising the steps of:
   (a) forming a homogeneous blend of thermoplastic matrix fibers and thermoplastic binder fibers, said binder fibers having a relatively low predetermined melting temperature and said matrix fibers having a relatively high predetermined melting temperature;
   (b) forming said blend of matrix and binder fibers into a fiber web of indeterminate length;
   (c) overlaying a plurality of said web layers to form the batt;
   (d) varying the number of said web layers overlaid according to a predetermined pattern wherein the batt has at least one integrally-formed, high density region extending in both a cross direction and a machine direction, and at least one integrally-formed relatively thin, low density region extending in both the cross direction and machine direction;
   (e) compressing said batt;
   (f) heating the batt while compressed to a temperature at or above the melting temperature of said binder fibers and below the melting temperature of said matrix fibers while compressed to fuse the matrix and binder fibers to each other to form a batt having intimately interconnected and fused web layers and intimately interconnected and fused matrix and binder fibers; and
   (g) cooling the batt to form a compressed batt having regions of differing thickness and density corresponding to the predetermined pattern.

2. A method according to claim 1, wherein the step of varying the number of web layers in the batt comprises the steps of:
   (a) moving a batt-supporting conveyor in the machine direction though a batt-formation zone;
   (b) laying successive web layers perpendicularly in the cross direction onto said moving conveyor in an overlapping relation by moving a reciprocating cross-lapping head carrying said web back and forth from a first side of the conveyor to an opposing second side;
   (c) at intervals according to a predetermined pattern, reversing the direction of the cross-lapping head at a point between the first and second sides of the conveyor to thereby lay two web layers of predetermined width one on top of the other in the cross direction; and
   (d) resuming an original direction of travel of said cross-lapping head to lay a third web layer over said two previously formed web layers to define said relatively thick, high density region, and then continuing the original direction of travel for the remainder of the width of the conveyor to thereby define said relatively, thin, low density region.

3. A method according to claim 1 or 2, and including the step of drafting the batt in the machine direction according to a predetermined pattern to progressively vary the thickness of the batt in the machine direction from the first to the second side of the conveyor.

4. A method according to claim 3, wherein the step of drafting the batt comprises the step of passing the batt between successive sets of drafting rolls positioned in spaced-apart relation along the machine direction of the batt conveyor.

5. A method according to claim 3, wherein the step of drafting the batt comprises the steps of:
   (a) passing the batt between successive sets of drafting rolls positioned in spaced-apart relation along the machine direction of the batt conveyor;
   (b) for a predetermined distance of travel of the batt progressively increasing the surface speed of a downstream set of said drafting rolls to progressively increase the draft and thereby progressively decrease the thickness of the batt;
   (c) for a predetermined distance of travel of the batt progressively decreasing the surface speed of the downstream set of said drafting rolls to progressively decrease the draft and thereby progressively increase the thickness of the batt; and
   (d) alternating steps (b) and (c) to form a batt having alternating regions of increasing and decreasing thickness.

6. A method according to claim 1, wherein the steps of compressing and heating the batt comprise the steps of:
   (a) positioning said batt on an air permeable support;
   (b) applying a vacuum through said batt from one side of the batt to the other and through said air permeable support sufficient to reduce the thickness and increase the density of the batt throughout the thickness of the batt; and
   (c) heating the multi-layer web structure to a temperature at or above the low melting temperature of said binder fibers and below the melting temperature of said matrix fibers while under vacuum and in the batt's reduced thickness state to fuse the binder fibers to themselves and to the matrix fibers to form a batt having intimately interconnected and fused web layers which retain the reduced thickness and increased density of the batt induced by the applied vacuum in both the relatively thick and relatively thin regions.

7. A method according to claim 2, wherein the step of laying successive web layers perpendicularly in the cross direction onto said moving conveyor in an overlapping relation comprises the step of:
   (a) providing first, second and third cross-lapping heads in series from an upstream portion to a downstream portion of said batt conveyor, each of which cross-lapping heads performing the step of:
   (b) laying successive web layers perpendicularly in the cross direction onto said moving conveyor in an overlapping relation by moving back and forth from a first side of the conveyor to an opposing second side.

8. A method of fabricating a multi-density batt, comprising the steps of:
   (a) forming a homogeneous blend of thermoplastic matrix fibers and thermoplastic binder fibers, said binder fibers having a relatively low predetermined melting temperature and said matrix fibers having a relatively high predetermined melting temperature;
   (b) forming said blend of matrix and binder fibers into a fiber web of indeterminate length;
   (c) varying the thickness of said web according to a predetermined pattern to form a batt wherein the batt has at least one integrally-formed, relatively thick, high density region extending in both a cross direction and a machine direction, and at least one integrally-formed relatively thin, low density region extending in both the cross direction and machine direction;
   (e) compressing said batt;
   (f) heating the batt while compressed to a temperature at or above the melting temperature of said binder fibers and below the melting temperature of said matrix fibers while compressed to fuse the matrix and binder fibers to each other to form a batt having intimately interconnected and fused web layers and intimately interconnected and fused matrix and binder fibers; and (g) cooling the batt to form a compressed batt having regions of differing thickness and density corresponding to the predetermined pattern.

* * * * *